(12) United States Patent
Doken

(10) Patent No.: US 12,050,839 B2
(45) Date of Patent: Jul. 30, 2024

(54) SYSTEMS AND METHODS FOR LEVERAGING SOUNDMOJIS TO CONVEY EMOTION DURING MULTIMEDIA SESSIONS

(71) Applicant: ROVI GUIDES, INC., San Jose, CA (US)

(72) Inventor: Serhad Doken, Bryn Mawr, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/941,246

(22) Filed: Sep. 9, 2022

(65) Prior Publication Data

US 2024/0086141 A1    Mar. 14, 2024

(51) Int. Cl.
G06F 3/048    (2013.01)
G06F 3/0482    (2013.01)
G06F 3/16    (2006.01)

(52) U.S. Cl.
CPC ............ *G06F 3/165* (2013.01); *G06F 3/0482* (2013.01)

(58) Field of Classification Search
CPC ............................... G06F 3/165; G06F 3/0482
See application file for complete search history.

(56) References Cited

U.S. PATENT DOCUMENTS

| | | | | |
|---|---|---|---|---|
| 6,963,839 B1* | 11/2005 | Ostermann | ............ | G10L 13/08 |
| | | | | 704/E13.011 |
| 11,362,848 B1* | 6/2022 | Lin | ............ | H04N 7/157 |
| 2019/0026015 A1* | 1/2019 | Lee | ............ | G11B 27/34 |
| 2020/0382868 A1* | 12/2020 | Felton | ............ | H04R 29/008 |
| 2021/0382610 A1* | 12/2021 | Prasad | ............ | G06F 3/04886 |
| 2022/0210514 A1* | 6/2022 | McBeth | ............ | H04N 21/854 |
| 2022/0210523 A1* | 6/2022 | Benedetto | ............ | G11B 27/19 |

OTHER PUBLICATIONS

"How to Use Facebook's New Soundmojis on Messenger, :how to use Facebook's New Soundmojis on Messenger," Jul. 21, 2021 (https://www.makeuseof.com/how-to-use-facebook-soundmojis-messenger/) (2 pages).
"Messenger launches 'Soundmojis' to add another element to your replies", "Messenger launches 'Soundmojis' to add another element to your replies," Jul. 15, 2021 (https://news.oneseocompany.com/2021/07/15/messenger-launches-soundmojis-to-add-another-element-to-your-replies_202107153759.html) (3 pages).
"How to Use Facebook's New Soundmojis on Messenger", URL: https://www.makeuseof.com/how-to-use-facebook-soundmojis-messenger/, 2 pages (retrieved on Sep. 9, 2022).
"Messenger launches 'Soundmojis' to add another element to your replies", URL: https://news.oneseocompany.com/2021/07/15/messenger-launches-soundmojis-to-add-another-element-to-your-replies_202107153759.html, 3 pages (retrieved on Sep. 9, 2022).

\* cited by examiner

*Primary Examiner* — Thanh T Vu
(74) *Attorney, Agent, or Firm* — HALEY GUILIANO LLP

(57) ABSTRACT

Systems and methods are provided for generating a soundmoji for output. A content item is generated for output at a computing device, and a first input associated with the selection of a soundmoji menu is received. One or more soundmojis are generated for output, and a second input associated with the selection of a first soundmoji of the one or more soundmojis is received. A first timestamp of the content item associated with the selection of the first soundmoji is identified. An indication of a second timestamp of the content item and a second soundmoji is received, and a user interface element associated with the content item is updated to indicate the second soundmoji when the content item is being generated for output at the second timestamp.

19 Claims, 10 Drawing Sheets

SYSTEMS AND METHODS FOR LEVERAGING SOUNDMOJIS TO CONVEY EMOTION DURING MULTIMEDIA SESSIONS

BACKGROUND

The present disclosure is directed towards systems and methods for generating an indication of one or more soundmojis and an associated user interface element for display. In particular, systems and methods are provided herein for generating an indication of a soundmoji and an associated user interface element for display at a particular timestamp of a content item.

SUMMARY

Video sharing and social media platforms, such as YouTube, TikTok, Instagram, Twitch and Facebook, enable users to easily share content items, such as videos, with one another. Some of these platforms enable users to livestream content, and other platforms, such as video conferencing platforms, enable a user to simultaneously stream content and receive visual feedback from a plurality of other users, in the form of a video stream. These platforms tend to be configured to enable users to provide reactions to content items that are shared via the platforms. Typically, these reactions are in the form of up/down votes, comments, emojis, GIFs and/or stickers. However, users may find it difficult to focus on both the video and any reactions to the video, including reactions received in a video conference via the streams of other participants, at the same time. Typically, users will consume a content item, or a portion of a content item, and will look at the reaction to the content item at a later time, or while pausing consumption of the content item. In addition, it is not always clear what part of a content item a reaction pertains to. While reactions comprising emojis, GIFs and/or stickers may convey, for example, an emotion in a succinct manner that is quicker to consume that text conveying an equivalent emotion, if many users react with the same emoji, GIF and/or sticker, the magnitude of the reaction is not immediately obvious.

To overcome these problems, systems and methods are provided herein for generating an indication of one or more soundmojis and an associated user interface element for display.

Systems and methods are described herein for generating an indication of one or more soundmojis and an associated user interface element for display. In accordance with some aspects of the disclosure, a method is provided that includes generating a content item for output at a computing device and receiving a first input associated with the selection of a soundmoji menu. In response to receiving the first input, the soundmoji menu comprising an indication of one or more soundmojis is generated for output, and a second input associated with the selection of a first soundmoji of the one or more soundmojis is received. A first timestamp of the content item associated with the selection of the first soundmoji is identified, and an indication of a second timestamp of the content item and a second soundmoji is received. A user interface element associated with the content item is updated to indicate the second soundmoji when the content item is being generated for output at the second timestamp.

In an example system, a user uses a computing device, such as a tablet, to access a content item, such as a video, via a video sharing platform, such as YouTube. The video is displayed at the tablet along with a user interface that enables a soundmoji to be selected. A user interacts with the user interface via, for example, a touch event, to select a soundmoji menu. On selection of the soundmoji menu, a plurality of indications, for example, icons, of soundmojis are generated for display in the soundmoji menu. A user selects a soundmoji from the menu via, for example, a second touch event, and a first timestamp of the content item associated with the selection of the soundmoji is identified, for example 1:32:03, indicating that the soundmoji was selected at one hour, 32 minutes and three seconds into the video. Subsequently, data indicating that a second soundmoji was selected at an indicated timestamp of the content item is received, for example, 1:48:43. When the content item arrives at this point, a user interface element is updated to indicate the second soundmoji. In some examples, the indication of the second soundmoji may be displayed for a fixed amount of time, for example five seconds. In other examples, the soundmoji may be displayed until a subsequent indication of a soundmoji and corresponding timestamp is received.

Content of the content item may be determined and, based on the determined content, one or more soundmojis may be identified. Generating the one or more soundmojis for output may further comprise generating the one or more identified soundmojis for output. An identification of a selected soundmoji and an associated timestamp may be received from a plurality of computing devices and, for each received timestamp and for each selected soundmoji, the number of times a soundmoji has been selected may be aggregated. A plurality of soundmojis associated with the content item may be identified, each soundmoji having an associated timestamp and, based on an aggregated number of times a soundmoji of the plurality of soundmojis has been selected for the associated first timestamp, a volume level for the first soundmoji may be identified. A sound associated with the first soundmoji may be output at the first volume level.

A threshold volume level may be identified and, in response to determining that the identified volume level exceeds the threshold volume level, the identified volume level may be reduced to the threshold volume level. A plurality of soundmojis associated with the content item may be identified, each soundmoji having an associated timestamp, and, based on an aggregated number of times a soundmoji of the plurality of soundmojis has been selected by a user profile having an identified characteristic for the associated first timestamp, a sound for the first soundmoji may be identified. The identified sound associated with the first soundmoji may be output. A soundmoji associated with the content item may be identified and, for a plurality of timestamps associated with the content item, a graphical representation of an aggregated number of times the identified soundmoji has been selected for each of the plurality of timestamps may be generated for output.

A query comprising an identification of a soundmoji may be received, and the query may be transmitted to a second computing device. An identification of a plurality of content items may be received, where the plurality of content items may be based on the query and an aggregated number of times the identified soundmoji has been selected for each content item of the plurality of content items. A representation of the plurality of content items may be generated for output, and a selection of the content item may be received. The content item may be a stream of a video conference. The second input may be audio input, and selecting the first soundmoji may further comprise mapping the audio input to a soundmoji of the one or more soundmojis.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
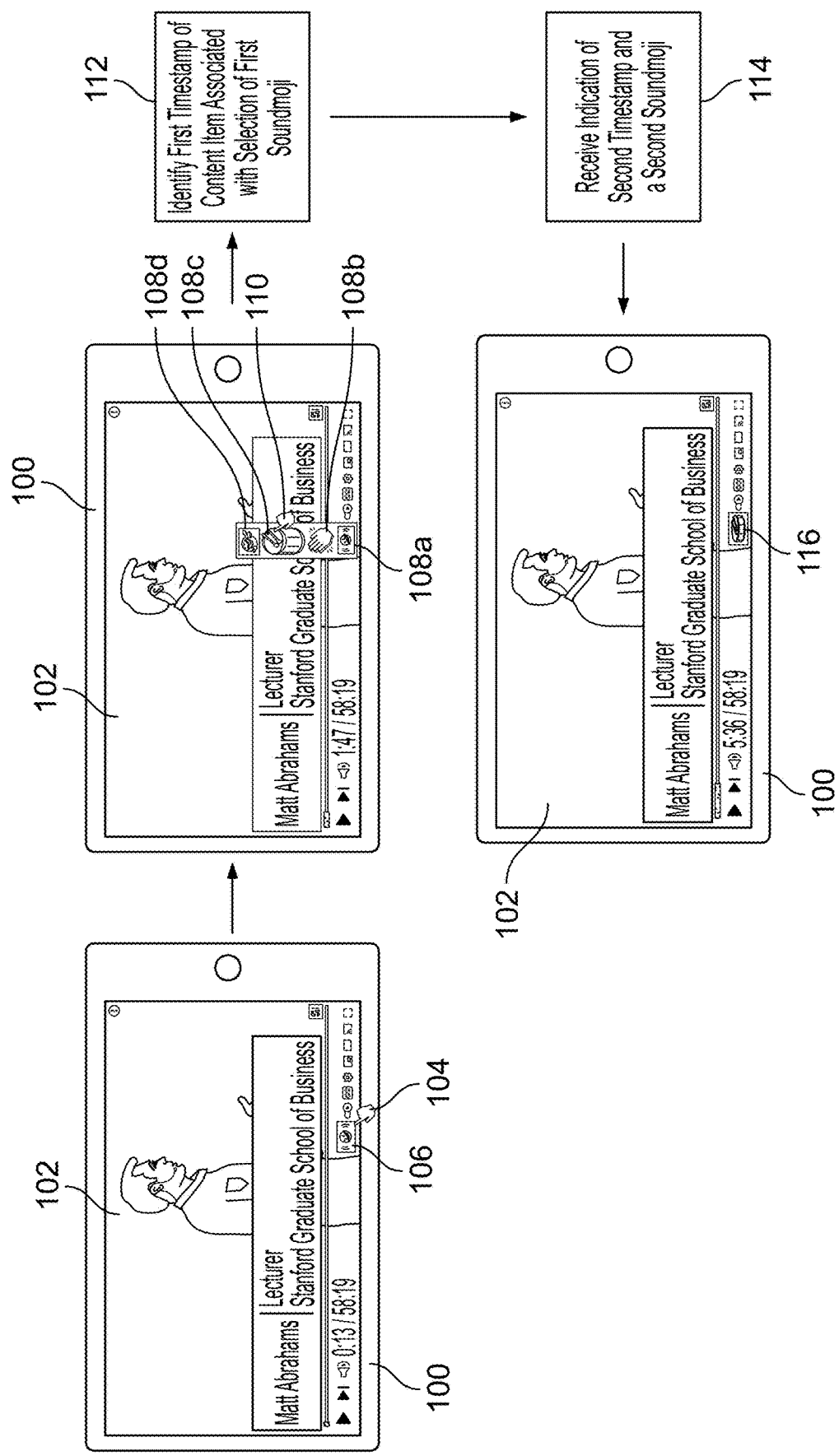
FIG. 1 shows an example environment in which an indication of one or more soundmojis and an associated user interface element are generated for display, in accordance with some embodiments of the disclosure.

Systems and methods are described herein for generating an indication of one or more soundmojis and an associated user interface element for display. A content item includes audio, video, text and/or any other media content. A content item may be a single media content item. In other examples, it may be a series (or season) of episodes of media content items. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device, and the computing device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

Receiving input includes receiving any input related to a computing device. Input may be received via an infrared controller, Bluetooth and/or Wi-Fi controller of the computing device, a touchscreen, a keyboard, a mouse and/or a microphone. In some examples, input may be received via a gesture performed on the touchscreen of a computing device and/or via a gesture that is captured via an image capture device, such as a camera, that is in communication with the computing device. In another example, the input may comprise instructions received via another computing device.

A soundmoji, or audi emoji, is an emoji that has audio associated with it. An emoji is a graphic or icon (e.g., a pictogram, logogram, ideogram, or smiley) that may be embedded in media (e.g., text). In a typical example, an emoji is meant to convey an emotional cue (e.g., depicting a facial expression). In some instances, an emoji does not necessarily convey an emotional cue. For example, an emoji may depict a country, flag, weather, food, or any other desired object. Returning to soundmojis, the audio associated with a soundmoji may play automatically via a speaker associated with a computing device. For example, if the soundmoji is associated with a timestamp of a content item, the soundmoji audio may play at that timestamp. In other examples, the audio of a soundmoji may play only when an input event is received in connection with the soundmoji. A soundmoji may have a fixed sound associated with it. In other examples, a soundmoji may have multiple sounds associated with it. In some examples, a soundmoji specification may describe audio that is to be associated with a soundmoji, and a platform may generate the sound to be output for a specific soundmoji, in a similar way to emojis that look different on different platforms but relate to the same emotion, or object. Some soundmojis may have customized sounds associated with them, for example, sounds that have been recorded by a user.

A communication port can be any communication circuitry. A communication port includes, for example, a wired and/or a wireless network card for connecting to a network, such as the internet. In another example, the communication port may connect to a wider network, such as the internet, via a local network, such as a local Wi-Fi network.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment, in which an indication of one or more soundmojis and an associated user interface element are generated for display, in accordance with some embodiments of the disclosure. The environment comprises a computing device, in this example a tablet 100, though any other suitable computing device is contemplated, including, for example, a smart television, a set-top box connectable to a display, a smart television dongle (or box), a smartphone, a laptop and/or a PC. The tablet 100 receives a content item 102 and generates it for output at the tablet 100. Typically, a media player and/or OTT application runs on the tablet, and the received content item 102 is generated for output via the media player and/or OTT application. The content item 102 may be transmitted to the tablet 100 via a network, such as the internet, comprising wireless and/or wired means. In some examples, the content item 102 and/or any metadata pertaining to soundmojis may be stored locally on the tablet 100. An input 104 selecting an interactive user interface element 106 relating to a soundmoji menu is received at the tablet 100. In this example, the input is a touch event on a touchscreen of the tablet 100, but any suitable input may be received, for example, via an infrared controller, Bluetooth and/or Wi-Fi controller of the computing device 100, a touchscreen, a keyboard, a mouse and/or a microphone. Different types of input may invoke different responses. For example, a short touch may cause the displayed soundmoji to be output at the tablet device, whereas a long touch may cause the soundmoji menu to open. On receiving the input, a soundmoji menu is generated for display, and is displayed, at the tablet 100.

The soundmoji menu comprises a plurality of indications of soundmojis, "crying with laughter" 108a, "clap" 108b, "drumroll" 108c, "laugh" 108d. In this example, the indications are similar to emojis; however, any suitable indication may be generated for display. Any number of indications of soundmojis may be displayed in the soundmoji menu, for example, one, two, four, 10, 15, 20. In some examples, the soundmoji menu may comprise a plurality of pages, or sections, in order to display the entirety of the soundmoji menu. Any pages of a soundmoji menu may be organized to group similar soundmojis together, for example, by category, type and/or loudness of the sound associated with the soundmoji. A second input 110, for selecting a soundmoji from the menu, is received at the tablet 100. Again, this second input 110 may be any type of suitable input, similar to input 104. In response to receiving the second input 100, a first timestamp of the content item 102 associated with the selected soundmoji is identified 112.

In some examples, this timestamp and/or associated soundmoji may be transmitted to a server, via a network such as the internet. The server may aggregate timestamps and soundmojis from a plurality of users. In some examples, a user may be able to deselect the soundmoji by providing a third user input associated with the previously selected soundmoji.

Subsequently, an indication of a second timestamp and a second soundmoji is received 114 at tablet 100. This indication may be generated, for example, by aggregating indications of timestamps and soundmojis from a plurality of computing devices. The indication of the second timestamp and/or second soundmoji may be transmitted to the tablet 100 via a network, such as the internet. In some examples, the timestamp may be a single timestamp. In other examples, the timestamp may be assigned to a range of timestamps, for example 00:00-00:15, indicating a range of fifteen minutes. In other examples, the range may be twenty seconds. The ranges may be static (i.e., a content item may be divided into ranges having the same, or a substantially similar, period). In other examples, the ranges may be dynamic, generated based on, for example, metadata associated with the content item and/or determination of the content of a content item by utilizing a trained machine learning algorithm. On receiving the indication of the second timestamp and second soundmoji, and on reaching the timestamp of the content item 102 at the tablet 100, a user interface element is updated, in this example, the user interface element 106 is updated to display a new indication of a soundmoji 116. In some examples, a user interface associated with the content item, or a media player for playing the content item, may comprise two volume indicators, one for the content item itself and one for the soundmoji sound output.

Figure 2:
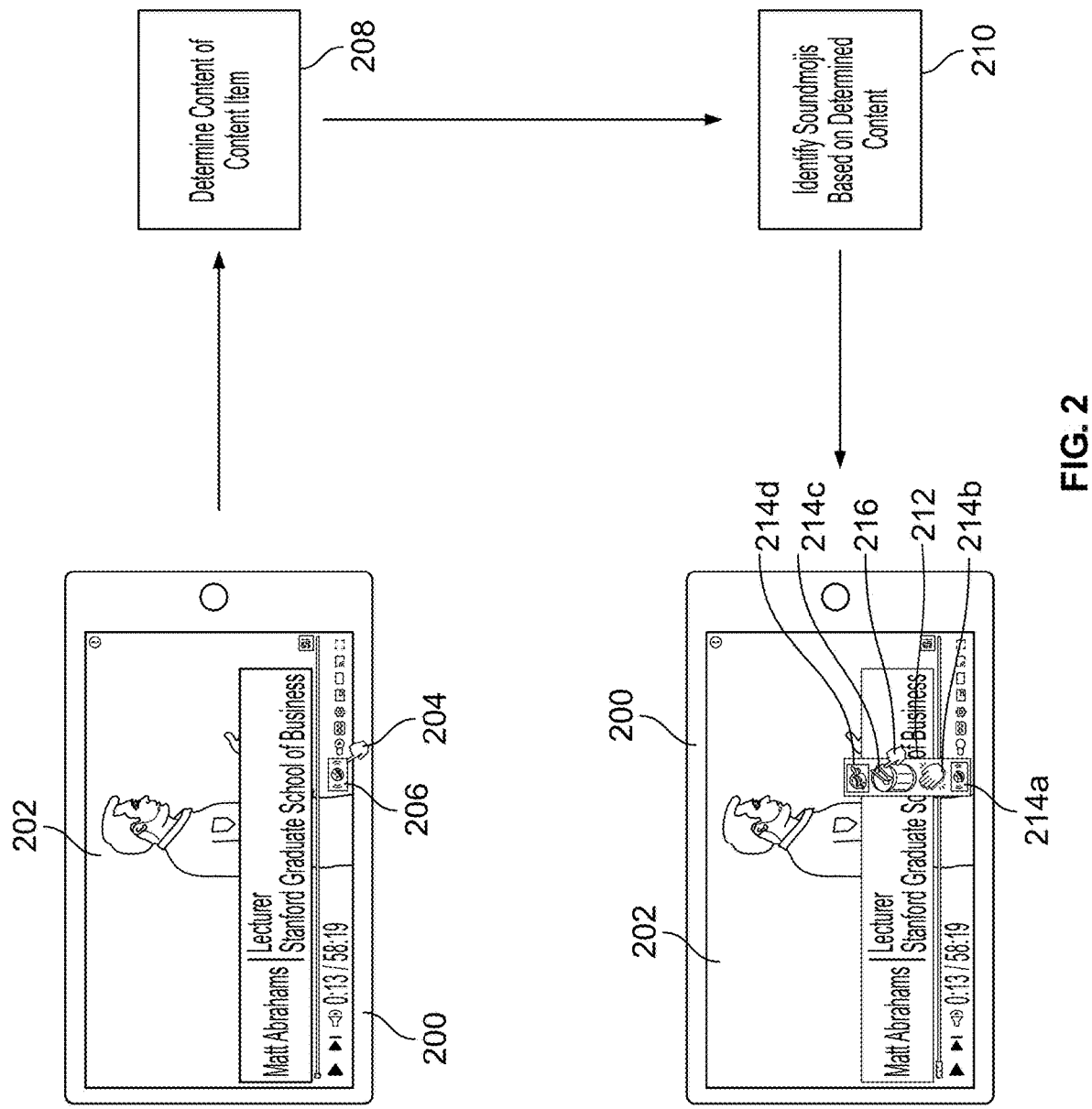
FIG. 2 shows another example environment in which an indication of one or more soundmojis and an associated user interface element are generated for display, in accordance with some embodiments of the disclosure.

FIG. 2 shows another example environment in which an indication of one or more soundmojis and an associated user interface element are generated for display, in accordance with some embodiments of the disclosure. In a similar manner to the environment shown in FIG. 1, the environment comprises a computing device that, in this example, is a tablet 200. Again, the tablet 200 receives a content item 202 and generates it for output. An input 204, such as one of the inputs described in connection with FIG. 1 above, selecting a user interface element 206 associated with a soundmoji is received. In response to receiving the input, content of the content item is determined 208. The determination 208 may comprise receiving and/or accessing metadata associated with the content item 202, or a portion of the content item 202. In another example, a trained machine learning algorithm may be utilized to determine content of the content item 202. The trained machine learning logarithm may be trained on, for example, similar content items. In some examples, the similar content items for training may have labels associated with different portions of the content items. The trained machine learning algorithm may run at a server remote from the tablet 200 and may transmit an indication of the content to the tablet 200 and/or the identification of the soundmojis may be performed at a server remote from the tablet 200 and an indication of suitable soundmojis may be transmitted to the tablet 200. In other examples, an artificial intelligence processor, such as Google Tensor or a Samsung Exynos processor, may be utilized to perform the determining and/or identification at the computing device. In another example, comments associated with the content item 202, or a portion of the content item 202, may be analyzed to determine an appropriate soundmoji, or soundmojis. In a variation of this example, rather than determining the content of a content item, the creator of a content item may select a subset of soundmojis to be associated with the content item, or with portions of the content item. By collecting aggregated data associated with the content item, the creator of the content item may be able to determine, for example, a typical emotional response associated with a content item, or a section of a content item.

On determining content of the content item, soundmojis are identified 210 based on the identified content. For example, if it is determined that the content item 202 relates to action, soundmojis for a fast car, running and/or an explosion may be identified. On identifying the soundmojis, a soundmoji content menu 212 comprising a plurality of soundmojis 214a, 214b, 214c, 214d is generated for display at the tablet 200. On receiving a second input 216, the soundmoji may be generated for output. In some examples, different soundmojis may be identified for different portions of the content item. In other examples, the content item may be pre-processed, so that the soundmoji menu can be updated in real time, or substantially real time, based on a determination 208 and/or identification 210, which has already been performed. Metadata describing suitable soundmojis for inclusion in a menu may be stored in a manner that is associated with the content item 202 at, for example, a server (or, in some examples, separate servers) and may be transmitted to the tablet 200. In some examples, the determination and/or identification may be performed substantially in real time and/or in response to an I-frame of the content item 202 being processed.

Figure 3:
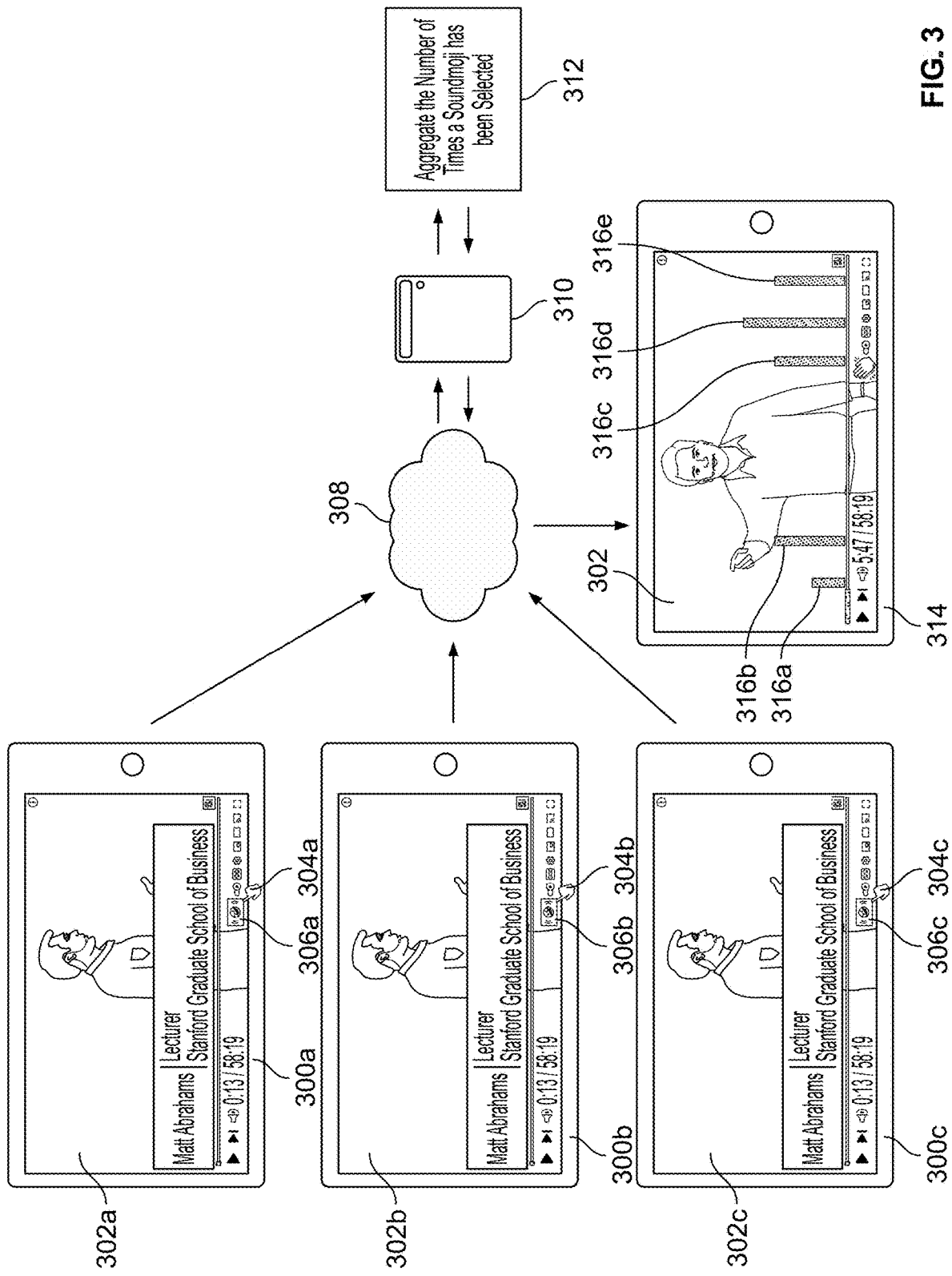
FIG. 3 shows another example environment in which an indication of one or more soundmojis and an associated user interface element are generated for display, in accordance with some embodiments of the disclosure.

FIG. 3 shows another example environment in which an indication of one or more soundmojis and an associated user interface element are generated for display, in accordance with some embodiments of the disclosure. The environment comprises a plurality of computing devices, in this example, first, second, third and fourth tablets 300a, 300b, 300c, 314, and server 310. Although first to third tablets 300a, 300b, 300c are indicated, any number of computing devices may provide input for aggregation, for example 50, 125, 1000, 15,000, 378,000 tablets. Each of the first, second and third tablets 300a, 300b, 300c receives the same content item 302a, 302b, 302c, though not necessarily simultaneously, and each tablet 300a, 300b, 300c generates the content item 302a, 302b, 302c for output at the tablet 300a, 300b, 300c. Each of the first, second and third tablets 300a, 300b, 300c receives an input 304a, 304b, 304c associated with the selection of a soundmoji. An indication of the soundmoji, and a timestamp of the content item associated with the selection of the soundmoji, is transmitted from the first, second and third tablets 302a, 302b, 302c via a network 308, such as the internet, to server 310. At the server 310, the number of times a soundmoji has been selected at a particular timestamp is aggregated 312. The aggregated number of times that a soundmoji has been selected at a timestamp, or range of timestamps, is transmitted to fourth tablet 314 via network 308. At the fourth tablet 314, an indicator of the number of times that a particular soundmoji has been selected for each timestamp, or range of timestamps, of the content item 302 are generated for display, and are displayed, in a graphical manner, in this example as bars 316a, 316b, 316c, 316d, 316e for each timestamp. Any other suitable graphical indicator, such as columns, a histogram, an xy scatter graph and/or a counter, is contemplated and may be utilized instead of bars. In some examples, the graphical indicators, such as bars 316a, 316b, 316c, 316d, 316e may be selectable and, on input associated with a bar, the content item 302 may be output at a timestamp associated with the bar. In addition, a user interface element may be utilized to select a particular soundmoji for which aggregated data should be displayed. Another user interface element may be utilized to switch between different methods for graphically displaying the aggregation data. In some examples, the aggregated data may be accessible via an analytics section of a website and/or application for a creator, or uploader, of the content item.

Figure 4:
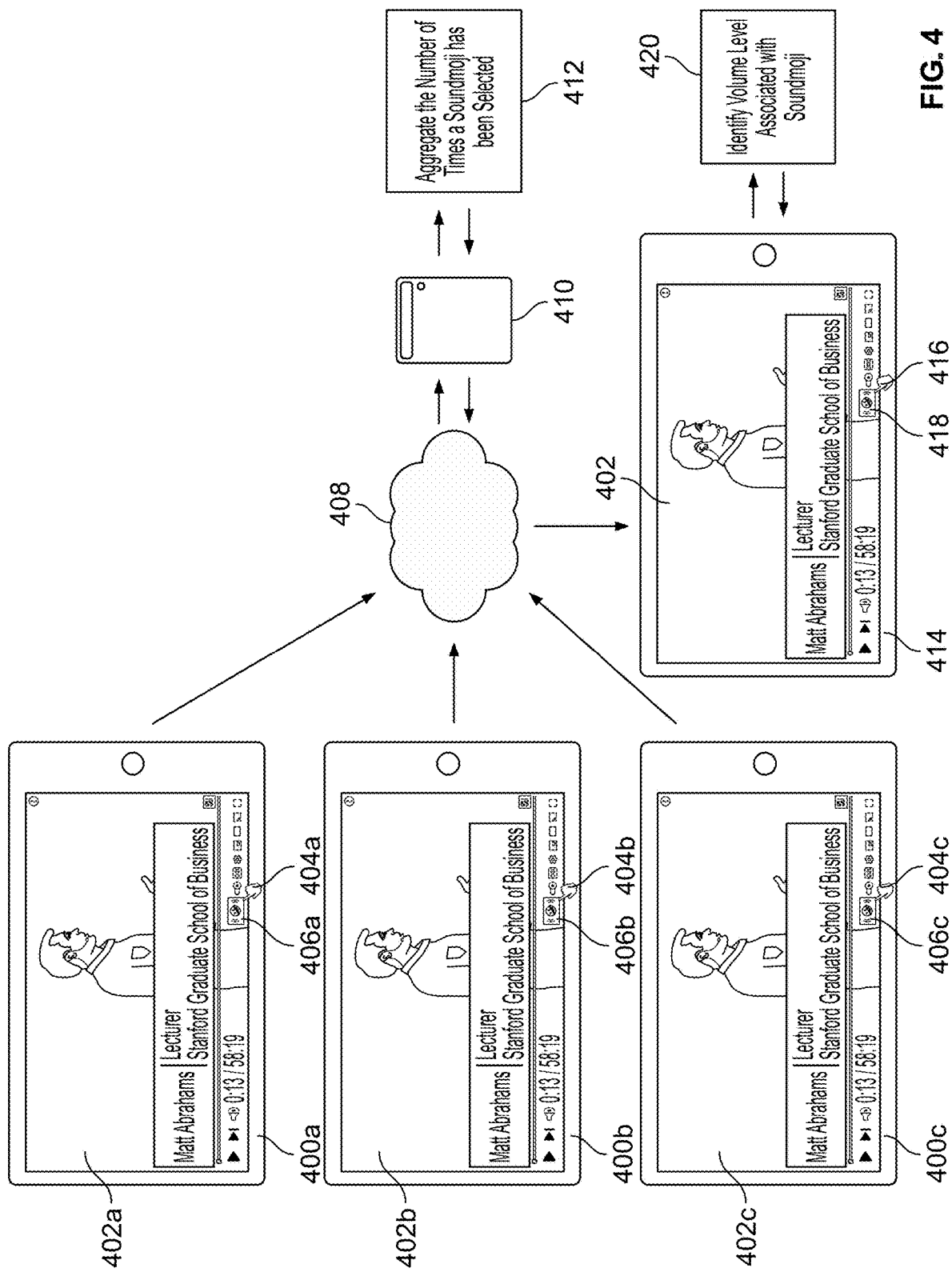
FIG. 4 shows another example environment in which an indication of one or more soundmojis and an associated user interface element are generated for display, in accordance with some embodiments of the disclosure.

FIG. 4 shows another example environment in which an indication of one or more soundmojis and an associated user interface element are generated for display, in accordance with some embodiments of the disclosure. In a similar manner to the environment depicted in connection with FIG. 3, the environment comprises a plurality of computing devices, in this example, first, second, third and fourth tablets 400a, 400b, 400c, 414, and server 410. Although first to third tablets 400a, 400b, 400c are indicated, any number of computing devices may provide input for aggregation, for example 50, 125, 1000, 15,000, 378,000 tablets. Each of the first, second and third tablets 400a, 400b, 400c receives the same content item 402a, 402b, 402c, though not necessarily simultaneously, and each tablet 400a, 400b, 400c generates the content item 402a, 402b, 402c for output at the tablet 400a, 400b, 400c. Each of the first, second and third tablets 400a, 400b, 400c receives an input 404a, 404b, 404c associated with the selection of a soundmoji. An indication of the soundmoji, and a timestamp of the content item associated with the selection of the soundmoji, is transmitted from the first, second and third tablets 402a, 402b, 402c via a network 408, such as the internet, to server 410. At the server 410, the number of times a soundmoji has been selected at a particular timestamp is aggregated 412. The aggregated number of times that a soundmoji has been selected at a timestamp, or range of timestamps, is transmitted to fourth tablet 414 via network 408. At the fourth tablet 414, in response to an input 416 selecting a soundmoji, a volume level associated with the soundmoji at a particular timestamp, or range of timestamps, of the content item 402 is identified 420 based on the received aggregated number of times that a soundmoji has been selected by other users. The soundmoji is output at the fourth tablet 414 at the identified volume level. In a variation on this example, soundmojis may be automatically output at the fourth tablet 414 at timestamps, or ranges of timestamps, that are indicated as being above a threshold aggregation count. For example, if over 50% of the plurality of tablets 400 indicated a particular soundmoji at a particular timestamp, or range of timestamps, of the content item 402, then the soundmoji may automatically be output at an identified volume level.

Figure 5:
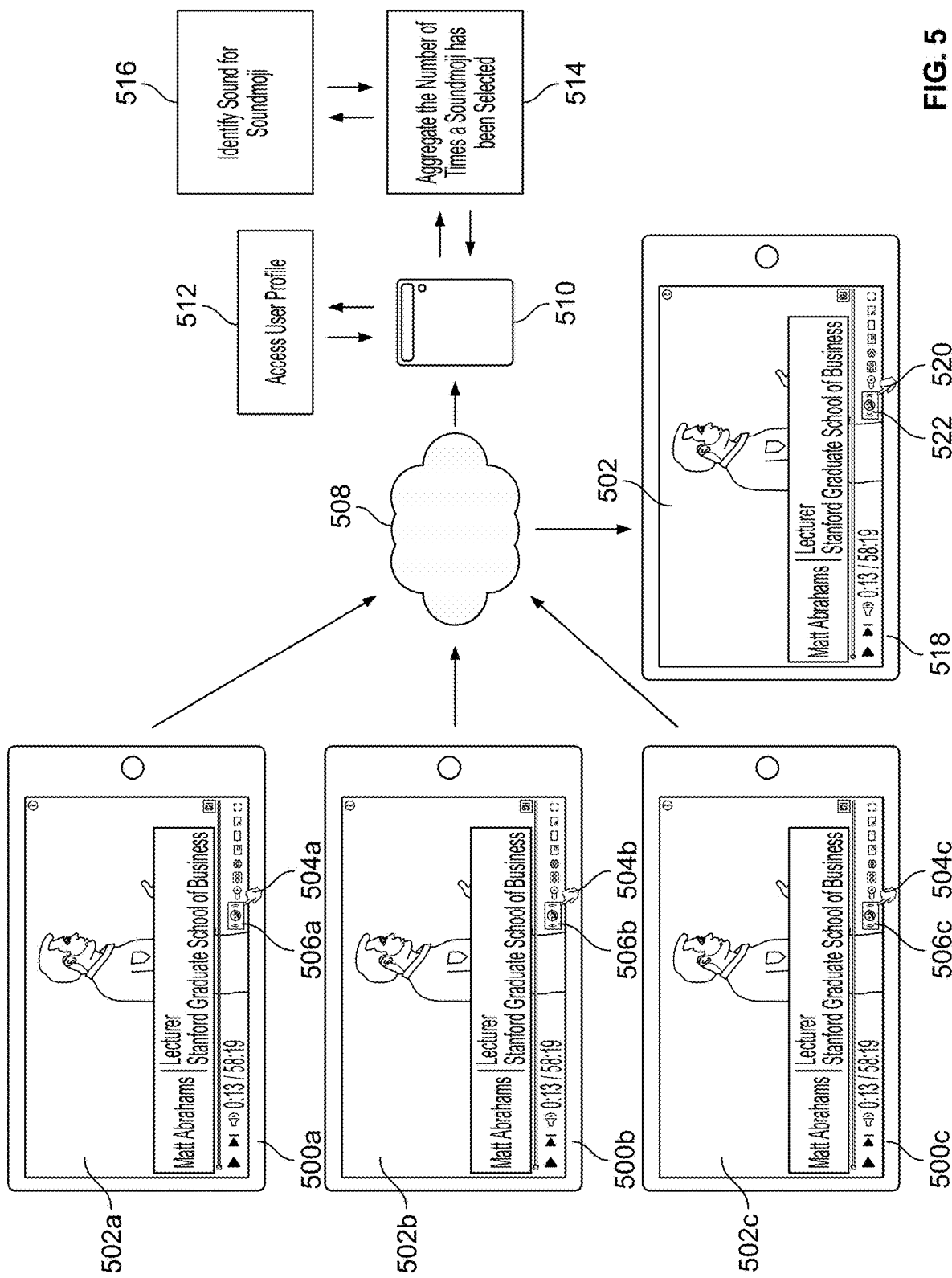
FIG. 5 shows another example environment in which an indication of one or more soundmojis and an associated user interface element are generated for display, in accordance with some embodiments of the disclosure.

FIG. 5 shows another example environment in which an indication of one or more soundmojis and an associated user interface element are generated for display, in accordance with some embodiments of the disclosure. In a similar manner to the environment depicted in connection with FIGS. 3 and 4, the environment comprises a plurality of computing devices, in this example, first, second, third and fourth tablets 500a, 500b, 500c, 514 and server 510. Although first to third tablets 500a, 500b, 500c are indicated, any number of computing devices may provide input for aggregation, for example 50, 125, 1000, 15,000, 378,000 tablets. Each of the first, second and third tablets 500a, 500b, 500c each receives the same content item 502a, 502b, 502c, though not necessarily simultaneously, and each tablet 500a, 500b, 500c generates the content item 502a, 502b, 502c for output at the tablet 500a, 500b, 500c. Each of the first, second and third tablets 500a, 500b, 500c receives an input 504a, 504b, 504c associated with the selection of a soundmoji and, in addition, a sound associated with the soundmoji is selected. The sound may be recorded by the user at the tablet 500*a*, 500*b*, 500*c* and/or may be selected from a predefined list of sounds. An indication of the soundmoji at a timestamp of the content item associated with the selection of the soundmoji and the sound associated with the soundmoji is transmitted from the first, second and third tablets 502*a*, 502*b*, 502*c* via a network 508, such as the internet, to server 510. At the server 510, user profiles associated with the first to third tablets 500*a*, 500*b*, 500*c* are accessed 512, the number of times a soundmoji has been selected at a particular timestamp is aggregated 514 and a sound for the soundmoji is identified 516 and also aggregated. Identifying the sound may comprise identifying the sound that has been selected from a list or, in another example, grouping similar recorded sounds together. At the fourth tablet 514, in response to an input 520 selecting a soundmoji, a sound associated with the soundmoji at a particular timestamp, or range of timestamps, of the content item 502 is identified based on the aggregated number of times that a soundmoji has been selected by other users and the user profiles that were accessed 512 at the server 510. For example, if the user profile at the fourth tablet 518 indicates that a user is male, a male laughing sound may be selected for use with the soundmoji if the aggregated data indicates that male user profiles prefer male laughter for a soundmoji at that particular timestamp of the content item 502. The sound for the soundmoji may be transmitted from the server 510 to the tablet 518 via network 508 or, in the example of a predefined list, the sounds may be preloaded at the tablet, and the sound may be selected at the tablet 518. The sound for the soundmoji is output at the fourth tablet 518. In a variation on this example, the identified sound for the soundmoji may be output at an identified volume level in a manner similar to that described in connection with FIG. 4 above.

Figure 6:
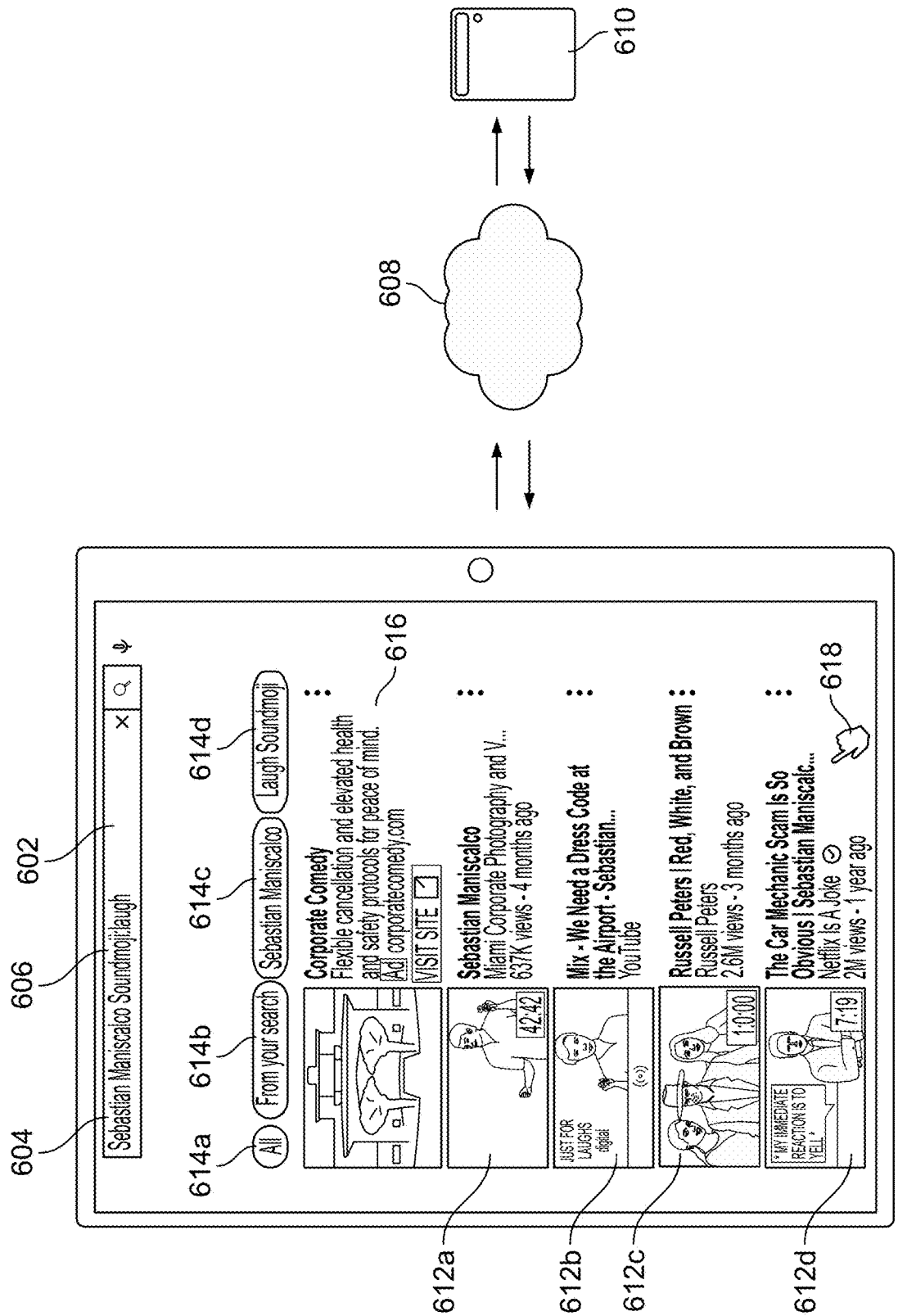
FIG. 6 shows another example environment in which an indication of one or more soundmojis and an associated user interface element are generated for display, in accordance with some embodiments of the disclosure.

FIG. 6 shows another example environment in which an indication of one or more soundmojis and an associated user interface element are generated for display, in accordance with some embodiments of the disclosure. The environment comprises a computing device, in this example tablet 600. Again, the tablet 600 may be any suitable computing device. A webpage or application is accessed at the tablet, for example a webpage or application for searching a video sharing platform. The webpage or application comprises a search box 602. A user provides input in the form of a query. The query comprises a search term 604, in this example, comedian "Sebastian Maniscalco" and an identification of a soundmoji 606, in this example "laugh." The identification of the soundmoji may be indicated by a specific search term, such as "Soundmoji." In some examples, the search term may be input via voice and in others via a keyboard displayed at the tablet 600. The query is transmitted from the tablet 600 via a network 608, such as the internet, to a server 610, where the query is processed. Query results are transmitted from the server 610, via the network 608 to the tablet 600, where they are generated for display and are displayed. In this example, the four search results 612*a*, 612*b*, 612*c*, 612*d* are generated for display, each related to Sebastian Maniscalco, and the soundmoji, or category of soundmojis indicated by the term "laugh." In some examples, the search results may be filtered by different categories, such as "All" 614*a*, "From your search" 614*b*, search term, in this example, "Sebastian Maniscalco" 614*c*, and/or by soundmoji, in this example "Laugh Soundmoji" 614*d*. The search results may be sortable by soundmoji, for example, by an aggregated number of times that a soundmoji, such as "Laugh" has been selected for a particular content item. In addition, an advertisement 616 may be generated for display based on the indicated soundmoji and may be displayed with the search results 612*a*, 612*b*, 612*c*, 612*d*. On input 618 selecting a search result, a content item is requested, generated for display and displayed at the tablet 600.

In another example, the methods and systems described herein may be applied to video conferencing sessions and/or any type of live streaming sessions. Video conferencing and/or live streaming sessions may take place via a web browser and/or a dedicated application. Many video conferencing and/or streaming solutions enable users to personalize their settings, profile picture and/or the background that is displayed during a session. In addition, users may wish to utilize customized soundmojis during a session, for example, by recording a particular sound to be associated with a soundmoji. When a user selects a soundmoji for output, the sound and, optionally, a visual representation of the soundmoji may be output at a computing device of all participants. In another example, the soundmoji may be output only at a computing device associated with the host of a session. During a session where there are a limited number of participants, customized sounds for one or more soundmojis may be transmitted directly from a computing device associated with the user who has customized their soundmoji to other computing devices that are receiving a stream associated with the session. In another example, the customized sound may be transmitted from the user to a host of the session, and from the host to the other participants of the session. In some examples, the sound may be transmitted to a server and either a stream of the sound, or an audio file for playback of the sound, may be transmitted from the server to the participants of the session, or to just the host of the session.

The server may create, and transmit, a separate audio stream to play out the soundmoji at, for example, an application running on a tablet. If the soundmoji is a stock and/or base soundmoji, and is not personalized, an indication of the specific soundmoji can be transmitted from a user and, for example, the table can output the soundmoji. In some examples, an indication of the participant sending the soundmoji may be transmitted along with the soundmoji. Session participants may have the option of selecting a setting that causes the indication of a participant sending a soundmoji to be displayed along with the output soundmoji, or just the have the soundmoji output. In some examples, the indication of participants may automatically be switched off if there are a large number of participants. In some examples, multiple participants may indicate soundmojis at the same, or similar times. In order to prevent confusing, or distorted, output, the soundmojis may be queued and output, for example, in a sequential manner. In another example, the soundmojis may be aggregated and the host may have an option for all soundmojis to be output at once.

A custom sound for a soundmoji may be recorded by any audio input device associated with a computing device, for example via a microphone of the computing device, and may be saved either locally at the computing device or may be transmitted to a server via a network, such as the internet. A fingerprint of the recording and/or the recording itself may be analyzed remotely, for example, at a server, to identify a characteristic associated with the recording. For example, if the recording is associated with an identified soundmoji, e.g., if the soundmoji is "laugh," it may be determined whether the recording associated with laughing, rather than something else, such as booing. In addition, the analysis may determine whether the recording comprises, for example, profanities.

In another example, during a session with a large number of participants, a streaming server may aggregate all received soundmoji input received and transmit it to a host of the livestream, with a tag, or tags, indicating the soundmoji types. The volume control method described herein may be utilized to prevent the host from being distracted by excessive soundmoji audio. In the case of a session with many participants, all of the participants may not be announced; however, a server may still store a received count of soundmojis and their type for analytics and tracking purposes. In another example, during a session, microphones on participant computing devices may receive audio input from users (e.g., reactions to the content item, such as laughing and/or whistles). This audio input may be analyzed, compared to a fingerprint and mapped to an existing soundmoji. This captured audio input may, for example, be transmitted to the host computing device (or a computing device of an active presenter) during the session, for use with soundmojis during the session. This method of capturing audio input may also be utilized with video-on-demand sessions, and audio input may be collected via ancillary devices in the vicinity of a user, such as from a remote-control microphone, a smart speaker microphone and/or a smart television microphone.

In some examples, a content item may comprise a video component, an audio component and soundmoji audio component. The audio component and the soundmojji audio component may have separate audio controls, such that the volume level of the audio component and the audio level of the soundmoji component may be controlled separately. In addition, a first mute function may be associated with the audio component of the content item and a second mute function may be associated with the soundmoji audio component. In some examples, there may be a single mute function; however, a user may enable a setting that enables soundmojis to ignore the mute function. In addition, soundmojis may be output at a computing device, even when a video component of a content item is not output at the computing device. Furthermore, a user may enable a setting that enables audio associated with a soundmoji to only be output at a secondary device associated with a first computing device, such as a smart speaker and/or earpods. In another example, the audio component of the content item may be analyzed to identify silent parts and/or relatively quiet parts and the audio component of the soundmoji may be output at the identified parts of the audio component. In some examples, the type of audio may be identified and soundmojis may be muted, or the output delayed, during a first type of audio, such as speaking, and the soundmojis may be output during a second type of audio, such as music.

In some examples, an application, such as a media player, associated with a content item may be minimized at a computing device, such that the content item is being received at a computing device, but it is not being generated for output. In response to an indication of a number of aggregated soundmojis being greater than a threshold amount, an notification, such as a visual and/or audible notification, may be generated at the computing device to prompt a user to maximize the media player. In another example, the media player may be automatically maximized in response a number of aggregated soundmojis being greater than a threshold amount.

In some examples, a platform, such as Twitter spaces and/or Clubhouse may host an audioconference. In response to soundmojis being posted to the platform, metadata associated with the soundmojis may be stored with a recording of the audioconference, such that when the audioconference is replayed at a later time, the soundmojis are reproduced.

Figure 7:
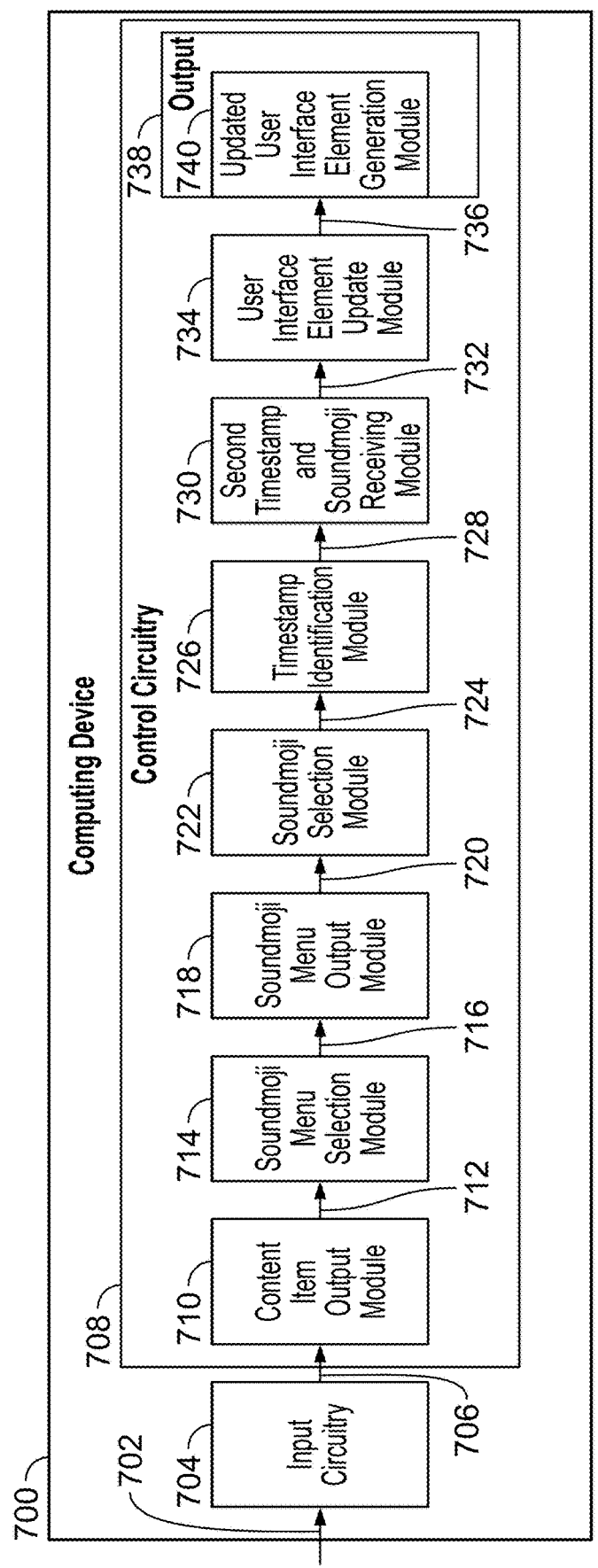
FIG. 7 shows a block diagram representing components of a computing device and dataflow therebetween for enabling an indication of one or more soundmojis and an associated user interface element to be generated for display, in accordance with some embodiments of the disclosure.

FIG. 7 shows a block diagram representing components of a computing device and dataflow therebetween for enabling an indication of one or more soundmojis and an associated user interface element to be generated for display, in accordance with some embodiments of the disclosure. Computing device 700 (e.g., tablet 100, 200, 314, 416, 518, 600), as discussed above, comprises input circuitry 704, control circuitry 708 and output circuitry 738. Control circuitry 708 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 702 by the input circuitry 704. The input circuitry 704 is configured to receive inputs related to a computing device. For example, this may be via an infrared controller, Bluetooth and/or Wi-Fi controller of the computing device 700, a touchscreen, a keyboard, a mouse and/or a microphone. In other examples, this may be via a gesture detected via an augmented, mixed and/or virtual reality device. In another example, the input may comprise instructions received via another computing device. The input circuitry 704 transmits 706 the user input to the control circuitry 708.

The control circuitry 708 comprises a content item output module 710, a soundmoji menu selection module 714, a soundmoji menu output module 718, a soundmoji selection module 722, a timestamp identification module 726, a second timestamp and soundmoji receiving module 730, a user interface element update module 734 and an updated user interface element generation module 740. The input is transmitted 706 to the content item output module 710, where a content item is generated for output at the computing device. An indication that the content item is being generated for output is transmitted 712 to the soundmoji menu selection module 714, where the control circuitry monitors for an input associated with the selection of a soundmoji menu. On receiving a selection of the soundmoji menu, an indication is transmitted 716 to the soundmoji menu output module 718, where a soundmoji menu is generated for output. In some examples, the soundmoji menu may comprise a plurality of icons that represent a plurality of soundmojis; these icons may be similar to emojis. An indication that the soundmoji menu has been generated for output is transmitted 720 to the soundmoji selection module 722, where the control circuitry monitors for an input associated with the selection of a soundmoji.

On receiving a selection of a soundmoji, an indication of the selected soundmoji is transmitted 724 to the timestamp identification module 726, where an indication of the selected soundmoji is and a timestamp of the content item at the point the soundmoji was selected is identified. In some examples, these indications may be transmitted to another computing device, such as a server, via a network, such as the internet. An indication is transmitted 728 to the second timestamp and soundmoji receiving module 730, where an indication of a second timestamp and soundmoji are received. In some examples, the indication of the second timestamp and soundmoji may be received via a network and from a server. In some examples, the indication of the second timestamp and soundmoji may be based on aggregated data from a plurality of other computing devices. For example, they may be an indication of a popular soundmoji (or soundmojis) for a particular timestamp, or range of timestamps, for a content item. The indication of the second timestamp and soundmoji is transmitted 732 to the user interface element update module 734, where a user interface element is updated to indicate the received soundmoji. An indication is transmitted 736 to the output circuitry 738, where the updated user interface element generation module 740 generates the indicated soundmoji for output at the indicated timestamp, or range of timestamps, of the content item. For example, a user interface element of a media player running on the computing device 700 may be updated to reflect the received soundmoji at the indicated timestamp, or at a range of timestamps based on the indicated timestamp, of the content item.

Figure 8:
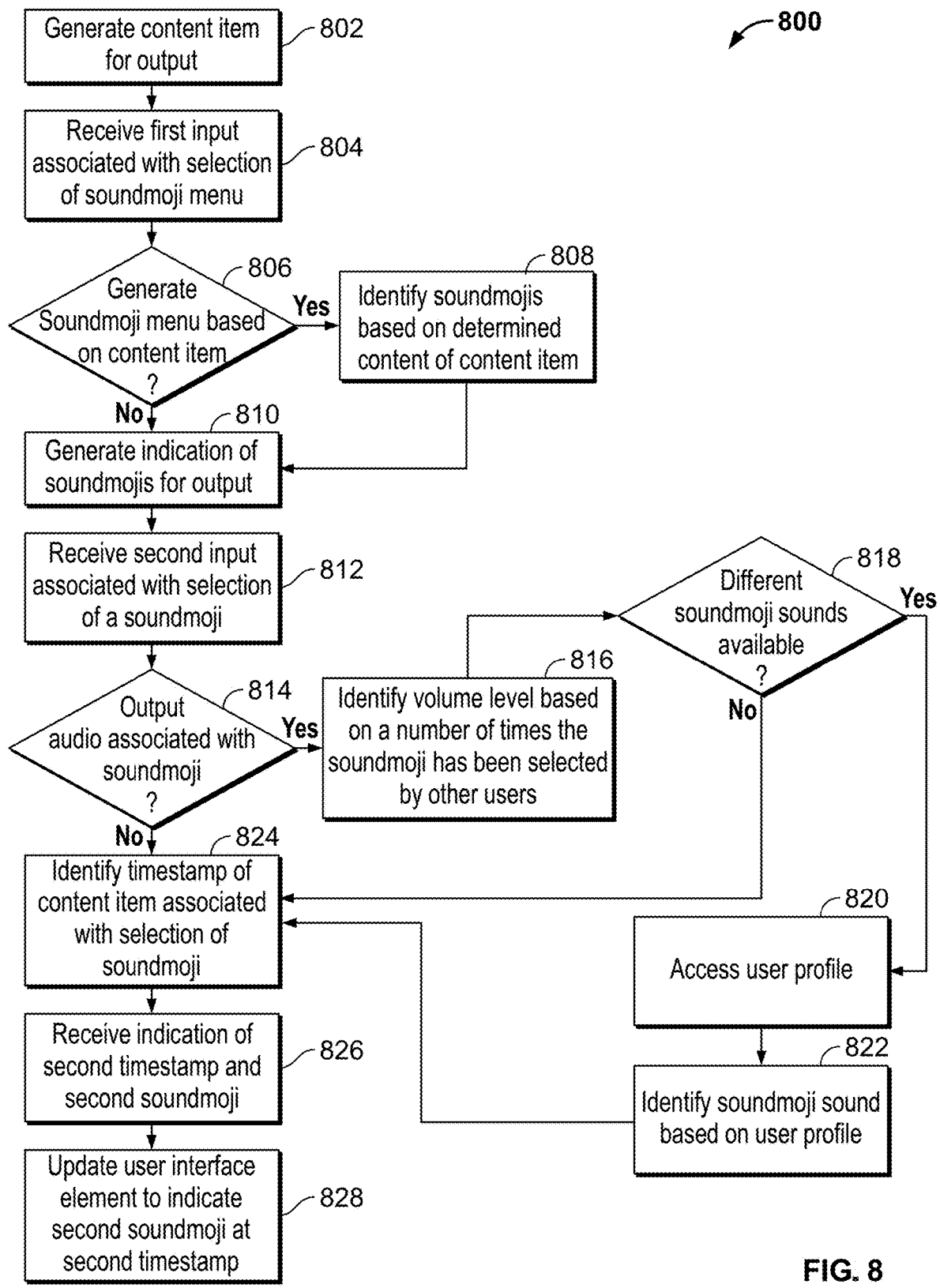
FIG. 8 shows a flowchart of illustrative steps involved in enabling an indication of one or more soundmojis and an associated user interface element to be generated for display, in accordance with some embodiments of the disclosure.

FIG. 8 shows a flowchart of illustrative steps involved in enabling an indication of one or more soundmojis and an associated user interface element to be generated for display, in accordance with some embodiments of the disclosure. Process 800 may be implemented on any of the aforementioned computing devices (e.g., tablet 100, 200, 314, 416, 518, 600). In addition, one or more actions of the process 800 may be incorporated into or combined with one or more actions of any other process or embodiments described herein.

At 802, a content item is generated for output. For example, a user may view a content via any suitable video streaming platform. The streaming platform may transmit the content item (e.g., a video) to a user's client device, such as a smartphone, and the client device may play the content item via a media player. The media player may comprise a user interface, including a progress bar interface, that enables a user to play, pause, or rewind the video (e.g., the progress bar interface shown in FIG. 1). If desired, the user may select a point in the progress bar to initiate playback at a corresponding point in the video.

At 804, a first input associated with the selection of a soundmoji menu (such as the soundmoji menu 212 shown in FIG. 2) is received. For example, the first input may be a touch event at a smartphone that indicates a particular user interface element associated with a soundmoji menu. The indicated user interface element may be a selectable icon (such as user interface element 206 shown in FIG. 2) that, when selected, causes the soundmoji menu to be generated for display at the smartphone.

At 806, it is determined whether to generate a soundmoji menu based on the content item that is being generated for output. For example, a user may select a setting via a user interface of a media player that may indicate that the soundmojis in the soundmoji menu are to be based on an aspect of the content item, such as a genre of the content item, and/or an event and/or action that takes place in the content item. In another example, the determination may be based on whether the content of the content item can be determined and, if the content of the content item cannot be determined, then the soundmojis of the soundmoji menu will not be based on the content item.

If it is determined to generate the soundmoji menu based on the content item, at 808, soundmojis are identified based on the determined content of the content item. For example, if the content item comprises comedy sections, then the soundmoji menu may comprise one or more soundmojis relating to comedy, such as a laughing soundmoji. The soundmoji menu may comprise soundmojis based solely on the content item or, in another example, the soundmoji menu may comprise soundmojis partially based on the content of the content item. The soundmojis displayed in the soundmoji menu may be based on a section of the content item. In another example, the soundmojis displayed in the content item may be based on the whole content item. Metadata associated with the content item may be utilized to determine the content of the content item. In other examples, a trained machine learning algorithm may be utilized to determined content of the content item. If, for example, it is determined that the content item generally is of the type "comedy," associated soundmojis may be included in the menu, such as a laughing soundmoji. The soundmojis included in the soundmoji menu may be based on the entire content item or, in other examples, may be based on a current section of the content item. In some examples, the soundmojis to be included in the soundmoji menu may be based on one or more of the title, the content type, the characters included in the content item, the actors in the content item, one or more voice(s) in the content item, music in the content item and/or on the length of the content item.

From step 806, or step 808, the process proceeds to 810, where an indication of the soundmojis included in the soundmoji menu are generated for output. Typically, this comprises generating a soundmoji menu (such as soundmoji menu 212 shown in FIG. 2) for output at the, for example, smartphone. In some examples, the menu comprises a plurality of selectable graphical icons (such as icons 214a, 214b, 214c, 214d shown in FIG. 2), similar to, or the same as, emojis. The soundmoji menu may be organized to group similar soundmojis together, for example, by category. In some examples, the menu may comprise a subset of available soundmojis. In other examples, the menu may comprise a plurality of navigable pages, each page comprising a plurality of soundmojis. In some examples, each of these pages may correspond to a category of soundmoji.

At 812, a second input associated with the selection of a soundmoji is received, for example a touch event at the smartphone that indicates a particular soundmoji from the soundmoji menu. Typically, the step comprises the user selecting a soundmoji from the soundmoji menu (e.g., via input 216 shown in FIG. 2). In an example, a user generates a first touch event at the smartphone to open the soundmoji and, in a second example, the user generates a second touch event at the smartphone to select a soundmoji from the soundmoji menu.

At 814, it is determined whether to output audio associated with the selected soundmoji. Typically, a soundmoji comprises graphical and audio components that are generated for output in response to the selection of a soundmoji. However, in some examples, a user may have selected a setting at the, for example, smartphone to prevent the audio associated with a selected soundmoji from being output. Such a setting may be relevant if, for example, the user is consuming a content item comprising a lot of speech and generating the audio of a soundmoji may make it difficult to hear what is being said. In this example, the user is able to selectively mute soundmoji sounds. In another example, a content creator may have indicated that selected soundmojis should only be aggregated for further use rather than output at the time of selection. Such a preference may be stored in association with a content item at a server and may be accessed, for example, by the smartphone at the same (or similar) time that a content item is accessed.

If audio is to be output, at 816, the volume level of the audio output is identified based on a number of times the selected soundmoji has been selected by other users. For example, soundmoji selections may be transmitted from a plurality of other computing devices and aggregated at a server. An indication of the number of selections may be transmitted via a network, such as the internet, to the, for example, smartphone. In one example, if the selected soundmoji has been selected a relatively large number of times at a plurality of other smartphones and/or tablets, then the volume level of the audio output of the soundmoji may be relatively loud. If, on the other hand, the selected soundmoji has been selected a relatively few number of times at a plurality of other smartphones and/or tablets, then the volume level of the audio output of the soundmoji may be relatively quiet. In some examples, the soundmojis may be aggregated for a whole content item. In other examples, the soundmojis may be aggregated based on a timestamp, or range of timestamps, of the content item.

At 818, it is determined whether different soundmojis sounds are available. If different soundmoji sounds are available, at 820, a user profile is accessed. For example, this might be a user profile associated with a content item delivery service, such as YouTube. For example, a soundmoji may have only a default sound associated with it. In another example, a user may have created, and stored, a plurality of different sounds for use with the soundmoji. In some examples, the user may have recorded sounds for different soundmojis at, for example, the smartphone. In other examples, the different sounds may be associated with a user profile and may be stored at a server remote from the, for example, smartphone. A sound may be transmitted via a network, such as the internet, to the, for example, smartphone. In one example, a user may select a birthday cake soundmoji at step 812, and the birthday cake soundmoji may have two sounds associated with it, a firecracker sound and a kazoo sound.

At 822, a soundmoji sound is identified based on the user profile. For example, if the user profile indicates that a user is male, a male laughing sound may be selected for use with the soundmoji. In some other examples, a plurality of profiles and preferred soundmoji sounds for each profile may be aggregated, and a soundmoji sound that is preferred by similar profiles may be selected. For example, a plurality of profiles from different users of a content item delivery service, such as YouTube, may be aggregated. Preferred soundmojis and data associated with the user profiles, for example data indicating a sex of the user, content item preferences and/or location, may be aggregated. From the aggregation, it may be identified that users located in the United States of America may prefer a guttural laugh, and users located in Canada may prefer a high-pitched laugh. On identifying that the present user is located in, for example, Canada, a high-pitched laugh may be generated in response to a laughing soundmoji being selected.

From step 814, step 818, or step 822, the process proceeds to 824, where a timestamp of the content item associated with the selection of a soundmoji is identified. For example, the timestamp at which user input associated with the selection of the soundmoji is identified. In another example, a range of timestamps of the content item may be identified, for example if a soundmoji was selected at when the content item was at two minutes and 30 seconds, the identified timestamp may be a range, such as 1-3 minutes. In this example, any soundmoji selected when the content item is at a timestamp that falls in the range 1-3 minutes is assigned that range.

At 826, an indication of a second timestamp and a second soundmoji is received. For example, as discussed above, a plurality of other computing devices may transmit indications of content item timestamps and soundmojis to a server. At the server these content items and timestamps may be aggregated. Based on the aggregation, an indication of a second timestamp and a second soundmoji may be transmitted to the, for example, smartphone. In one example, a comedy content item may have a particularly funny section where a relatively large number of other uses have selected a laughing soundmoji. Indications of these selections may be aggregated and the, for example, smartphone may receive an indication of the timestamp and soundmoji associated with the funny section.

At 828, a user interface element is updated to indicate the second soundmoji at the second timestamp of the content item. For example, a user interface element of a media player that is generating the content item for output is updated to indicate the second soundmoji at the indicated second timestamp, or a range of timestamps based on the indicated timestamp. For example, the laughing emoji may be displayed on the progress bar of the video at a portion of the progress bar corresponding to the second timestamp. As another example, any suitable marker or indication may be displayed at a portion corresponding to the second timestamp. In an embodiment, a user may "hover" over (e.g., via a mouse) the marker or indication, resulting in the soundmoji being displayed. In another embodiment, a user may click on the marker or indication to cause the soundmoji to be displayed. The soundmoji may be audibly sounded at that point. In an embodiment, the soundmoji may be displayed without audio. The user may then click on the soundmoji to cause the audio to be provided.

Figure 9:
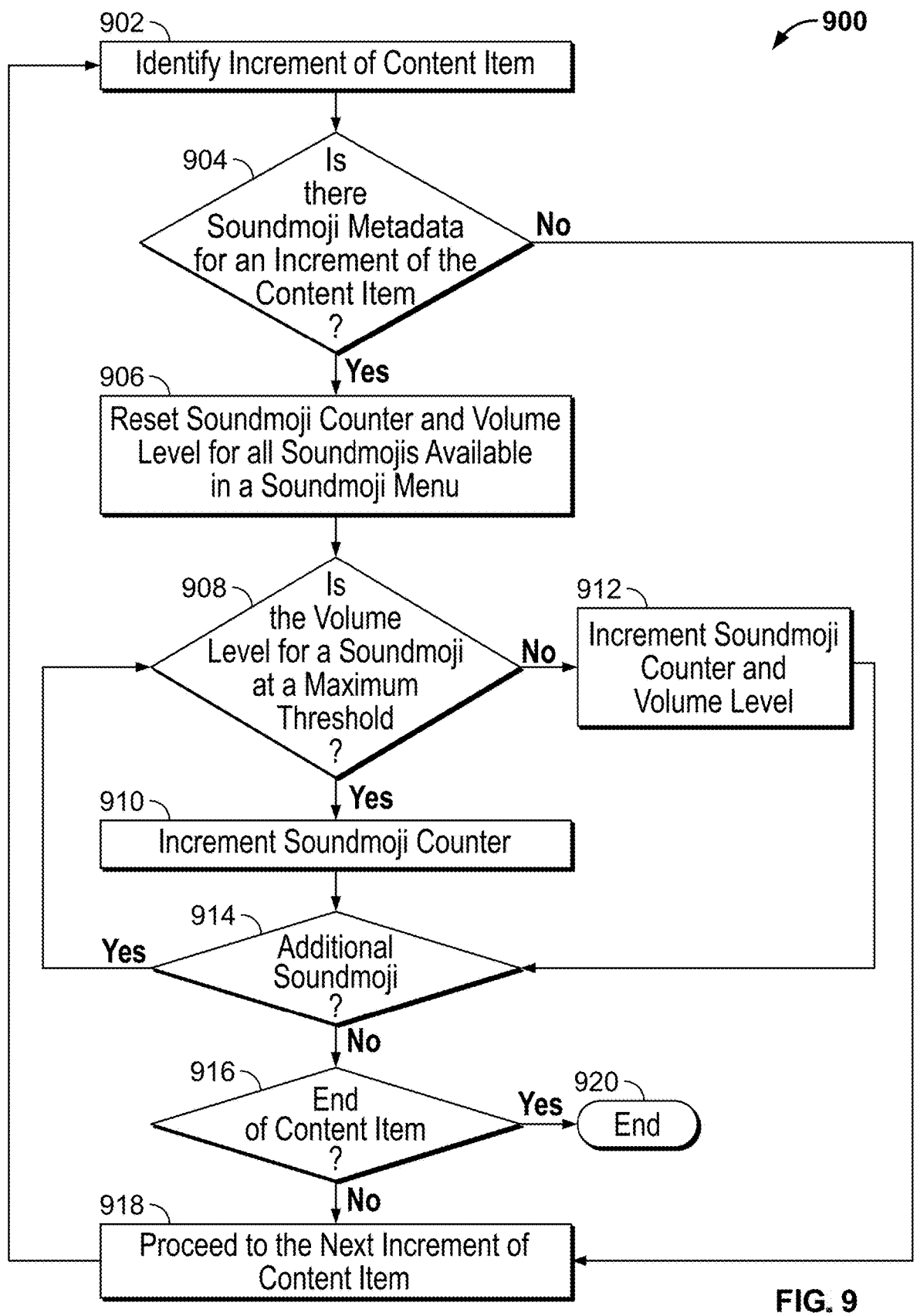
FIG. 9 shows a flowchart of illustrative steps involved in aggregating soundmoji data, in accordance with some embodiments of the disclosure.

FIG. 9 shows a flowchart of illustrative steps involved in aggregating soundmoji data, in accordance with some embodiments of the disclosure. Process 900 may be implemented on any of the aforementioned computing devices (e.g., tablet 100, 200, 314, 416, 518, 600). In addition, one or more actions of the process 900 may be incorporated into or combined with one or more actions of any other process or embodiments described herein.

At 902, an increment of a content item is identified, and, at 904, it is determined whether there is soundmoji metadata for the identified increment of the content item. The soundmoji metadata may comprise aggregated metadata, from a plurality of computing devices, that indicates soundmoji selections for that increment of the content item. An increment of the content item may, for example, be a section comprising a certain amount of time, such as five minutes. The increments of the content item may be static (i.e., always a certain amount of time), or dynamic (i.e., varying amounts of time). Dynamic increments may be generated based on, for example, metadata associated with the content item and/or a trained machine learning algorithm. If there is no soundmoji data associated with an increment of the content item, the process proceeds to the next increment of the content item at 916. Otherwise, at 906, a counter associated with a soundmoji is reset, and the volume level for all soundmojis available in a soundmoji menu is reset to a default level, including zero.

At 908, it is determined whether the volume level for a soundmoji of, for example, a plurality of soundmojis that are available for selection in a soundmoji menu, indicated by the metadata, is at a maximum threshold. If the volume level is at a maximum threshold, a counter associated with the soundmoji is incremented at 910, thereby aggregating the number of times that a particular soundmoji has been selected by a plurality of users for an increment of the content item. If the volume level for a soundmoji is not at a maximum level, both the counter associated with the soundmoji and a volume level associated with the sound level are incremented at 912. At 914, it is identified whether additional soundmojis are to be analyzed, for example, whether there are additional soundmojis available for selection in a soundmoji menu. If there are additional soundmojis available for selection, the process loops to 908. Otherwise, the process proceeds to 916, where it is determined whether the end, or end increment, of the content item has been reached. If the end of the content item has not been reached, the process proceeds to the next increment of the content item at 918 and loops back to 902, where the next increment of the content item is identified. If the end of the content item has been reached, the process ends at 920. In this way, data is aggregated that enables a soundmoji to be output at a volume level that corresponds to the number of times that it has been selected by other users. An indication of the volume level and/or counter may be transmitted to another computing device that enables the computing device to output a selected soundmoji at a volume level that reflects the amount of times that the soundmoji has been selected, up to a threshold (i.e., the maximum volume level). The computing device may also utilize the counter data to output a graphical representation (not shown) of the number of times a soundmoji has been selected by other users.

Figure 10:
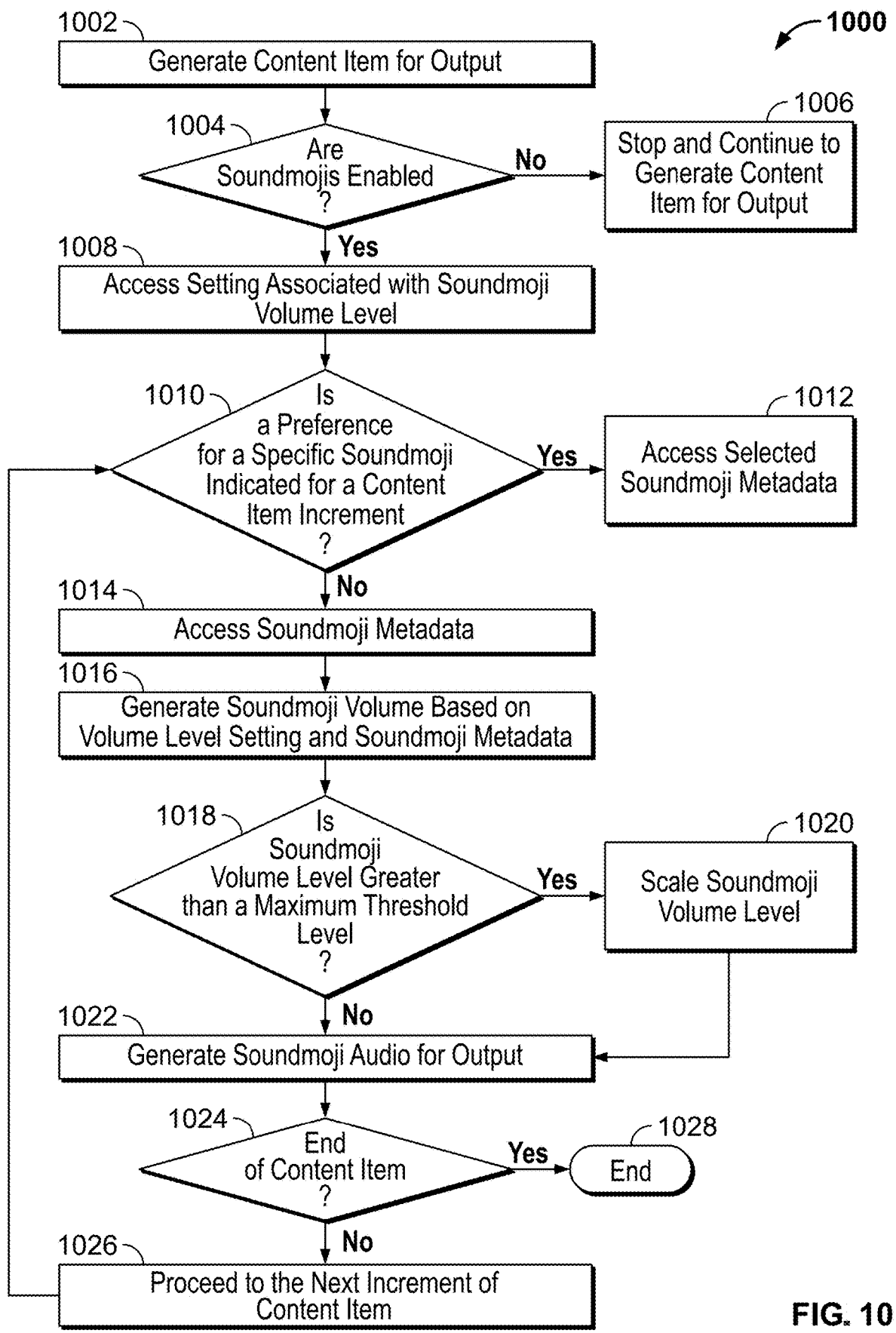
FIG. 10 shows a flowchart of illustrative steps involved in soundmoji playback, in accordance with some embodiments of the disclosure.

FIG. 10 shows a flowchart of illustrative steps involved in soundmoji playback, in accordance with some embodiments of the disclosure. Process 1000 may be implemented on any of the aforementioned computing devices (e.g., tablet 100, 200, 314, 416, 518, 600). In addition, one or more actions of the process 1000 may be incorporated into or combined with one or more actions of any other process or embodiments described herein.

At 1002, a content item is generated for output, and at 1004 is it identified whether soundmojis are enabled, for example via an option selected in a settings menu of a media player. In another example, a setting may be selected at an operating system level and may be applied to applications running on the operation system. If soundmojis are not enabled, at 1006, the process stops, and the content item is continued to be generated for output. If soundmojis are enabled, at 1008, a setting associated with soundmoji volume level is accessed. This may be one of the aforementioned settings menus. At 1010, it is determined whether there is a preference for a specific soundmoji, or type of soundmojis, for a content item increment. If there is a preference, soundmoji data for the specific soundmoji, or type of soundmoji, is accessed at 1012. If there is not a preference, soundmoji data for all available soundmojis is accessed at 1014. From element 1012, or element 1014, the process proceeds to 1016, where a soundmoji is generated for output at a volume based on the accessed volume level setting and the soundmoji metadata. At 1018, it is determined whether the soundmoji volume level is greater than a maximum threshold level. If the soundmoji level is greater than the maximum threshold level, the soundmoji volume is scaled at 1020. For example, the soundmoji volume may be scaled by multiplying a volume level set by a media player by an aggregated soundmoji counter divided by the maximum threshold volume level. From element 1018, or element 1020, the process proceeds to 1022, where a soundmoji audio is generated for output. At 1024, it is determined whether the end, or final increment, of the content item has been reached. If the end has not been reached, the process proceeds to 1026, where the process proceeds to the next increment of the content item, and loops back to step 1010. If the end has been reached, the process proceeds to 1028, where the process ends.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating for output, at a first computing device, a first content item;
   receiving a first input associated with a selection of a soundmoji menu;
   in response to receiving the first input, generating the soundmoji menu comprising one or more icons, each icon associated with a soundmoji for output, wherein each icon enables a soundmoji comprising a predefined association of an emoji component with an audio component to be selected;
   receiving a second input associated with a selection of a first icon of the one or more icons, the first icon associated with a first soundmoji;
   identifying a first timestamp of the first content item associated with the selection of the first icon;
   receiving an indication of a second timestamp of the first content item and a second soundmoji;
   updating a user interface element associated with the first content item to indicate the second soundmoji when the first content item is being generated for output at the second timestamp;
   receiving a query comprising an identification of a third soundmoji;
   transmitting the query to a second computing device;
   receiving an identification of a plurality of content items, wherein the plurality of content items is based on the query and an aggregated number of times the identified third soundmoji has been selected for each content item of the plurality of content items;
   generating, for output, a representation of the plurality of content items; and
   receiving a selection of a second content item from the plurality of content items.

2. The method of claim 1, further comprising:
   determining content of the first content item; and
   identifying, based on the determined content, one or more soundmojis, wherein:

generating the soundmoji menu further comprises generating the soundmoji menu comprising the one or more soundmojis identified based on the determined content.

3. The method of claim 1, further comprising:
receiving, from a plurality of computing devices, an identification of a selected soundmoji and an associated timestamp; and
aggregating, for each received timestamp and for each selected soundmoji, a number of times a soundmoji has been selected.

4. The method of claim 1, further comprising:
identifying a plurality of soundmojis associated with the first content item, each soundmoji having an associated timestamp;
identifying, based on an aggregated number of times a soundmoji of the plurality of soundmojis has been selected for the first timestamp, a volume level for the first soundmoji; and
outputting, at the identified volume level, a sound associated with the first soundmoji.

5. The method of claim 4, further comprising:
identifying a threshold volume level; and
in response to determining that the identified volume level for the first soundmoji exceeds the threshold volume level, reducing the identified volume level for the first soundmoji to the threshold volume level.

6. The method of claim 1, further comprising:
identifying a plurality of soundmojis associated with the first content item, each soundmoji having an associated timestamp;
identifying, based on an aggregated number of times a soundmoji of the plurality of soundmojis has been selected by a user profile having an identified characteristic for the associated first timestamp, a sound for the first soundmoji; and
outputting the identified sound associated with the first soundmoji.

7. The method of claim 1, further comprising:
identifying a soundmoji associated with the first content item; and
generating for output, for a plurality of timestamps associated with the first content item, a graphical representation of an aggregated number of times the identified soundmoji has been selected for each of the plurality of timestamps.

8. The method of claim 1, wherein the first content item is a stream of a video conference.

9. The method of claim 1, wherein:
the second input is audio input; and
selecting the first soundmoji further comprises mapping the audio input to a soundmoji of the one or more soundmojis.

10. A system comprising:
input/output circuitry configured to:
receive, at a computing device and via a communication port, a first content item;
receive a first input associated with a selection of a soundmoji menu;
receive a second input associated with a selection of a first soundmoji from the soundmoji menu;
receive an indication of a second timestamp of the first content item and a second soundmoji;
receive a query comprising an identification of a third soundmoji;
transmit the query to a second computing device;
receive an identification of a plurality of content items; and
receive a selection of a second content item from the plurality of content items; and
processing circuitry configured to:
generate for output, at the computing device, the first content item;
in response to the first input, generate the soundmoji menu comprising one or more icons, each icon associated with a soundmoji for output, wherein each icon enables a soundmoji comprising a predefined association of an emoji component with an audio component to be selected;
identify a first timestamp of the first content item associated with the selection of the first soundmoji; and
update a user interface element associated with the first content item to indicate the second soundmoji when the first content item is being generated for output at the second timestamp; and
generate, for output, a representation of the plurality of content items, wherein the plurality of content items is based on the query and an aggregated number of times the identified third soundmoji has been selected for each content item of the plurality of content items.

11. The system of claim 10, wherein the processing circuitry is further configured to:
determine content of the first content item; and
identify, based on the determined content, one or more soundmojis, wherein:
the processing circuitry configured to generate the soundmoji menu is further configured to generate the soundmoji menu comprising the one or more soundmojis identified based on the determined content.

12. The system of claim 10, wherein the processing circuitry is further configured to:
receive, from a plurality of computing devices, an identification of a selected soundmoji and an associated timestamp; and
aggregate, for each received timestamp and for each selected soundmoji, a number of times a soundmoji has been selected.

13. The system of claim 10, wherein the processing circuitry is further configured to:
identify a plurality of soundmojis associated with the first content item, each soundmoji having an associated timestamp;
identify, based on an aggregated number of times a soundmoji of the plurality of soundmojis has been selected for the associated first timestamp, a volume level for the first soundmoji; and
output, at the identified volume level, a sound associated with the first soundmoji.

14. The system of claim 13, wherein the processing circuitry is further configured to:
identify a threshold volume level; and
in response to determining that the identified volume level for the first soundmoji exceeds the threshold volume level, reduce the identified volume level for the first soundmoji to the threshold volume level.

15. The system of claim 10, wherein the processing circuitry is further configured to:
identify a plurality of soundmojis associated with the first content item, each soundmoji having an associated timestamp;

identify, based on an aggregated number of times a soundmoji of the plurality of soundmojis has been selected by a user profile having an identified characteristic for the associated first timestamp, a sound for the first soundmoji; and output the identified sound associated with the first soundmoji.

16. The system of claim 10, wherein the processing circuitry is further configured to:

identify a soundmoji associated with the first content item; and generate for output, for a plurality of timestamps associated with the first content item, a graphical representation of an aggregated number of times the identified soundmoji has been selected for each of the plurality of timestamps.

17. The system of claim 10, wherein the first content item is a stream of a video conference.

18. The system of claim 10, wherein:

the second input is audio input; and the processing circuitry configured to select the first soundmoji is further configured to map the audio input to a soundmoji of the one or more soundmojis.

19. A method comprising:

generating for output, at a computing device, a content item;

receiving a first input associated with a selection of a soundmoji menu;

in response to receiving the first input, generating the soundmoji menu comprising an indication of one or more soundmojis for output;

receiving a second input associated with a selection of a first soundmoji of the one or more soundmojis;

identifying a first timestamp of the content item associated with the selection of the first soundmoji;

receiving an indication of a second timestamp of the content item and a second soundmoji;

updating a user interface element associated with the content item to indicate the second soundmoji when the content item is being generated for output at the second timestamp;

receiving a query comprising an identification of a third soundmoji;

transmitting the query to a second computing device;

receiving an identification of a plurality of content items, wherein the plurality of content items is based on the query and an aggregated number of times the identified third soundmoji has been selected for each content item of the plurality of content items;

generating, for output, a representation of the plurality of content items; and receiving a selection of a second content item from the plurality of content items.

* * * * *